March 4, 1941.                C. S. COCKERELL                2,234,023
                        VISUAL INDICATOR FOR RADIO COURSE
                              Filed July 18, 1938

Inventor
Christopher S. Cockerell
By
Attorney

Patented Mar. 4, 1941

2,234,023

UNITED STATES PATENT OFFICE 2,234,023

VISUAL INDICATOR FOR RADIO COURSE

Christopher Sydney Cockerell, Danbury, England, assignor to Radio Corporation of America, a corporation of Delaware Application July 18, 1938, Serial No. 219,897
In Great Britain August 7, 1937

2 Claims. (Cl. 250—11)

This invention relates to navigation aiding systems and has for its object to provide an improved visual indicator arrangement for operation by a navigation aiding radio receiver adapted to cooperate with a navigation aiding transmitter of the equi-signal type, i. e. of the type wherein a predetermined course or direction is characterized by the presence along the said course or direction of different signals at equal strengths the different signals being received at different strengths by a receiver which is off the said predetermined course or direction. Probably the most usual type of equi-signal radio transmitter is that in which complementary interlocking signals, for example Morse dots and dashes, constitute the two different signals and are transmitted alternately in different directions representable by overlapping loop or lobe shaped polar diagrams so that said signals are received at equal strength by a receiver upon the predetermined course line, the dots and dashes being transmitted on a common modulation frequency of the same carrier wave.

According to this invention a navigation aiding receiver for use in cooperation with a navigation aiding radio transmitter of the equi-signal type includes a phase splitting circuit fed with the received signals, said circuit being adapted to produce two equal voltages in quadrature from signal voltage set up across it; a cathode ray tube indicator; means for deflecting the ray in said cathode ray tube indicator in mutually perpendicular directions; means for applying one of the quadrature voltages from the phase splitting circuit to deflect the ray in one of said two directions; and means for applying the other of the said quadrature voltages from the said phase splitting circuit to deflect the ray in the other of the said two directions.

The invention will now be described with reference to the accompanying drawing as applied to a navigation aiding radio receiver adapted to cooperate with a navigation aiding transmitter of the kind transmitting on a predetermined common constant modulation frequency of the same carrier, two different signals, one constituted by dots and the other by dashes, the different signals being sent alternately in such manner as to be received at equal strength by a receiver situated along a predetermined course or direction line, i. e., the equi-signal line.

Figure 1:
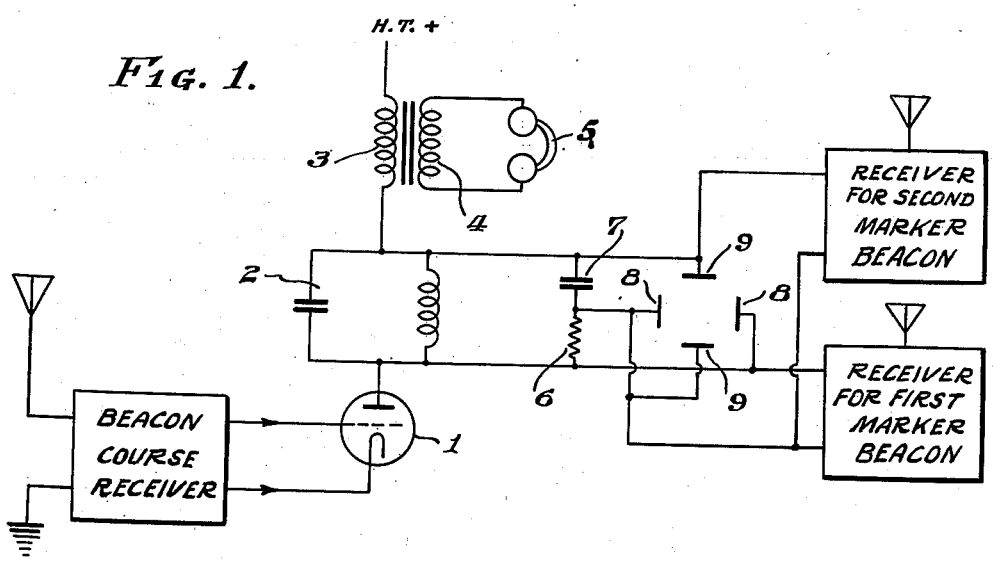
Figure 1 is a circuit diagram of the essential elements of the invention.

In this embodiment of the invention, which is illustrated diagrammatically in the accompanying Fig. 1, the radio receiver proper is of any convenient well known general type. The receiver as a whole is therefore not shown, only those parts necessary to an understanding of the present invention being shown in Fig. 1. Referring to Fig. 1, there is included in the anode circuit of the last valve 1 thereof a tuned circuit 2 resonant at the modulation frequency in series with the primary 3 of an output transformer 3, 4, whose secondary 4 feeds into a pair of telephones 5 as in the usual way. Shunted across the tuned circuit 2 is a phase splitting circuit consisting of a resistance 6 and a condenser 7 in series, the said resistance and condenser being so dimensioned that at the modulation frequency their impedances are equal. Accordingly, for any modulation voltage set up across the phase splitting circuit there will be produced two equal voltages in quadrature, one across the resistance 6 and the other across the condenser 7. There is provided an indicator in the form of a cathode ray tube having a fluorescent screen. This tube, which may be a so-called miniature type of soft low voltage tube, is provided with mutually perpendicular ray deflecting means, for example, two mutually perpendicular pairs of deflector plates. In Fig. 1 the tube is represented only by two mutually perpendicular pairs of deflector plates referenced respectively 8 and 9. The pair of plates 8 is connected across the resistance 6 of the phase splitting circuit and the other pair 9 is connected across the condenser 7, two of the plates (one in each pair) being common.

Figure 2:
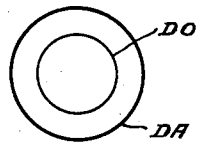
Figures 2, 3 and 4 represent cathode ray traces indicating a radio course of the "dot and dash" type.
Figure 3:
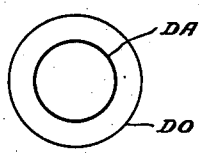
Figure 4:
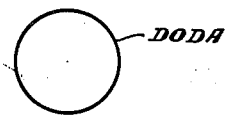

With the above arrangement it will be appreciated that any voltage set up across the circuit 2 will cause the cathode ray to be deflected along a circular path. If the receiver is receiving dots and dashes at unequal amplitudes the cathode ray will produce two circular traces upon the fluorescent screen said tracings being concentric but of different diameters since the amplitudes are different. Since the time duration of a dot is only a small fraction of that of a dash it will be easy to distinguish by the relative brightness of the tracings on the screen which circle is due to the dots and which to the dashes. Accordingly, so long as the receiver is off the predetermined course, there will be two circular tracings and a comparison of their relative brightness will indicate to the pilot of an aircraft or other vehicle carrying the receiver, which direction he should alter course in order to reach the guiding line. When the receiver is on the line the two circles become of the same diameter, i. e., they coincide. The results obtained are represented in Figs. 2, 3 and 4 which represent the tracks on the cathode ray tube screen in three different conditions of reception. In Fig. 2 the dash signals (the outer circle DA) are bigger than the dot signals (the inner circle DO); in Fig. 3 the dot circle (DO) is bigger than the dash circle (DA); in Fig. 4 the two circles coincide in the one circle DODA. Fig. 4 therefore shows the equi-signal or "on course" indication.

Figure 5:
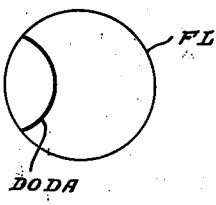
Figures 5 and 6 are cathode ray traces indicating a radio course and marker beacons.
Figure 6:
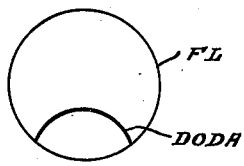

It is common practice in navigation aiding radio systems of the general nature in question to use an equi-signal transmitter to lead the aircraft into an aerodrome and to provide, in addition to this transmitter, one or more so-called "marker" transmitters situated at different points along the guiding line so that the pilot of an aircraft may be informed of the progress of his approach. In a receiver in accordance with this invention signals received from such a "marker" beacon may be applied to the cathode ray deflecting means in superimposition upon the quadrature voltages from the phase splitting circuit in such manner that there will be a characteristic, recognizable shifting of the pattern on the screen when the aircraft is passing over a "marker" beacon. For example, in the case in which there are two "marker" beacons on the way into an aerodrome the voltages obtained by rectifying signals from one "marker" beacon may be applied to one pair of mutually perpendicular pairs of plates in the tube and the voltages obtained by rectifying the signals from the second "marker" beacon may be applied to the other pair. Thus, assuming the aircraft is upon the guiding line, the pilot will see a single circular tracing such as DODA of Fig. 4 upon the screen of the cathode ray tube until he is passing over the first "marker" beacon. When this occurs the superimposed voltages derived from the said beacon will shift the circular tracing in one direction—for example, laterally—as shown in Fig. 5 and when he has passed the said beacon the circular tracing will reappear in its original central position. When the aircraft passes over the second beacon the circular trace will again be shifted, this time in the vertical direction, e. g., as shown in Fig. 6. In Figs. 5 and 6 the circle FL represents the fluorescent screen.

The advantages of the invention are (1) that the indications given are direct and in very easily read form, (2) that the apparatus required is simple, economical and reliable, (3) that false signals due to interference, magneto noise or the like will be easily recognized as such by the pilot since they will produce a picture quite different from the navigation aiding pictures, and (4) no time base is required for the cathode ray tube.

I claim as my invention:

1. A navigation-aiding receiver comprising means for receiving radio beacon signals of the alternately keyed equi-signal type, means for receiving marker impulses, a cathode ray indicator including means for deflecting the ray in said indicator in mutually perpendicular directions, means for deriving components in phase quadrature from said received beacon signals, means for applying said components to said deflecting means to produce circular traces whose diameters correspond to the amplitudes of said beacon signals, and means for radially displacing said traces to indicate the reception of said marker impulses.

2. In a navigation-aiding system for aircraft which includes alternately keyed directional radiation fields defining equi-signal courses and having vertically directed marker signals at spaced intervals on said courses, a first receiver responsive to said radiation fields, means responsive to said marker signals, a cathode ray indicator including means for deflecting the ray in said indicator in mutually perpendicular directions, means for deriving signal components in phase quadrature with each other from said receiver, means for applying said components to said deflecting means to produce circular traces whose diameters correspond to the respective amplitudes of said radiation fields at the point of reception, and means for radially displacing said traces in response to the reception of said marker signals, the direction of said displacement being different for different ones of said marker signals.

CHRISTOPHER SYDNEY COCKERELL.